US009363331B2

(12) United States Patent
Suzuki et al.

(10) Patent No.: US 9,363,331 B2
(45) Date of Patent: Jun. 7, 2016

(54) DATA ALLOCATION METHOD AND DATA ALLOCATION SYSTEM

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Hiromasa Yamauchi, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 432 days.

(21) Appl. No.: 14/063,259

(22) Filed: Oct. 25, 2013

(65) Prior Publication Data

US 2014/0052806 A1 Feb. 20, 2014

Related U.S. Application Data

(63) Continuation of application No. PCT/JP2011/060473, filed on Apr. 28, 2011.

(51) Int. Cl.
*H04L 29/08* (2006.01)
*G06F 9/50* (2006.01)

(52) U.S. Cl.
CPC ............ *H04L 67/322* (2013.01); *G06F 9/5088* (2013.01)

(58) Field of Classification Search
USPC .......................... 709/207, 226, 202, 242, 248
See application file for complete search history.

(56) References Cited

U.S. PATENT DOCUMENTS 6,167,061 A * 12/2000 Nakatsugawa .......... H04L 69/18
370/480
6,584,080 B1 * 6/2003 Ganz .................. H04B 7/15528
370/315
8,249,092 B2 * 8/2012 Maeda ................ H04L 27/2608
370/437

(Continued)

FOREIGN PATENT DOCUMENTS

JP 2004-88200 3/2004
JP 2005-235019 9/2005

(Continued)

OTHER PUBLICATIONS

International Preliminary Report on Patentability issued Nov. 7, 2013 in corresponding International Patent Application No. PCT/JP2011/060473.

(Continued)

*Primary Examiner* — Jude Jean Gilles
(74) *Attorney, Agent, or Firm* — Staas & Halsey LLP

(57) ABSTRACT

A data allocation method executed by a data allocation system. The data allocation method includes allocating to a first processing apparatus included among a plurality of processing apparatuses and allocating based on a first communication speed of the first processing apparatus, data having communication amount information on a frequency at which the processing apparatuses access the data, and further supplying first priority level information to the first processing apparatus; and exchanging based on variation of a communication speed of at least one processing apparatus among the processing apparatuses, the data or the first priority level information, and data or second priority level information allocated to a second processing apparatus included among the processing apparatuses and having a second communication speed.

13 Claims, 8 Drawing Sheets

(56) References Cited

U.S. PATENT DOCUMENTS

| | | | |
|---|---|---|---|
| 2005/0204044 A1 | 9/2005 | Araki | |
| 2005/0278608 A1* | 12/2005 | Murasawa | H04L 25/0262 714/776 |
| 2006/0209669 A1* | 9/2006 | Nishio | H04L 5/0007 370/208 |
| 2008/0189416 A1* | 8/2008 | Yamada | H04L 12/5695 709/226 |
| 2009/0306844 A1* | 12/2009 | Arita | B60R 1/00 701/31.4 |

FOREIGN PATENT DOCUMENTS

| | | |
|---|---|---|
| JP | 2006-201896 | 8/2006 |
| JP | 2006-252218 | 9/2006 |
| JP | 2006-277308 | 10/2006 |
| JP | 2007-241394 | 9/2007 |

OTHER PUBLICATIONS

International Search Report mailed Jul. 5, 2011 in corresponding International Application PCT/JP2011/060473.

\* cited by examiner

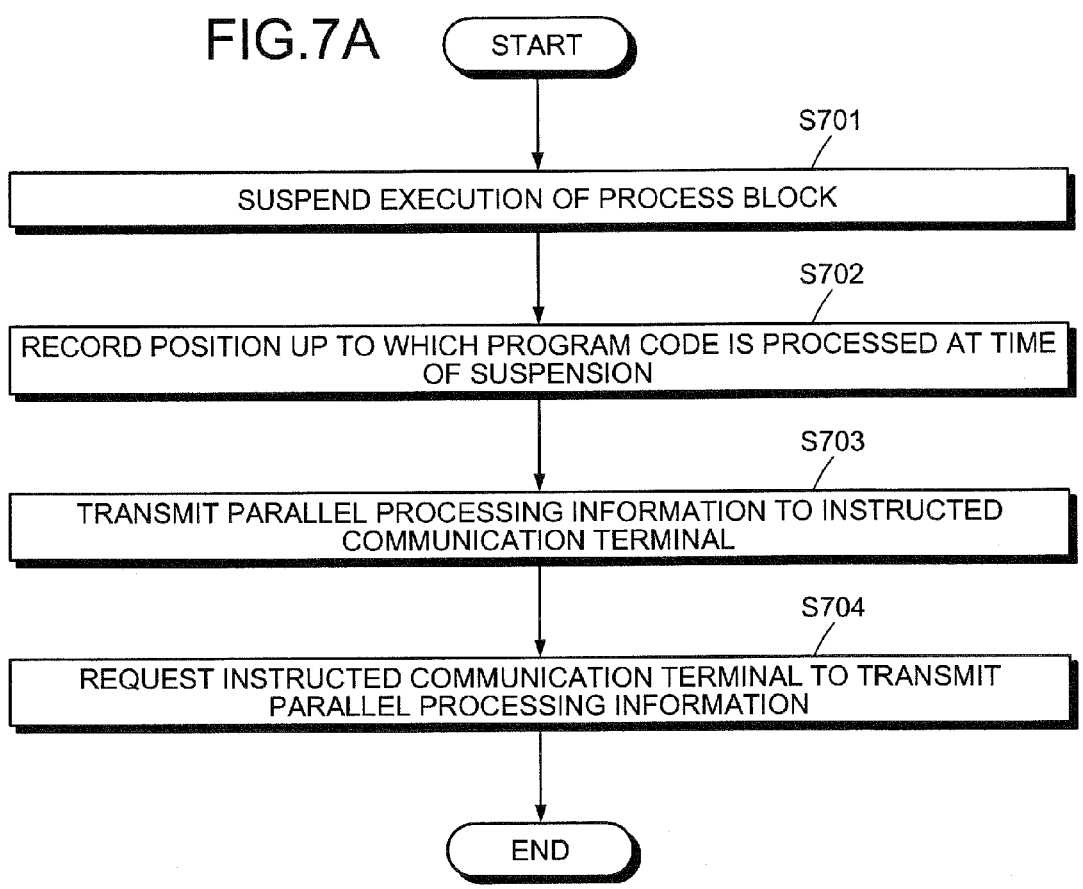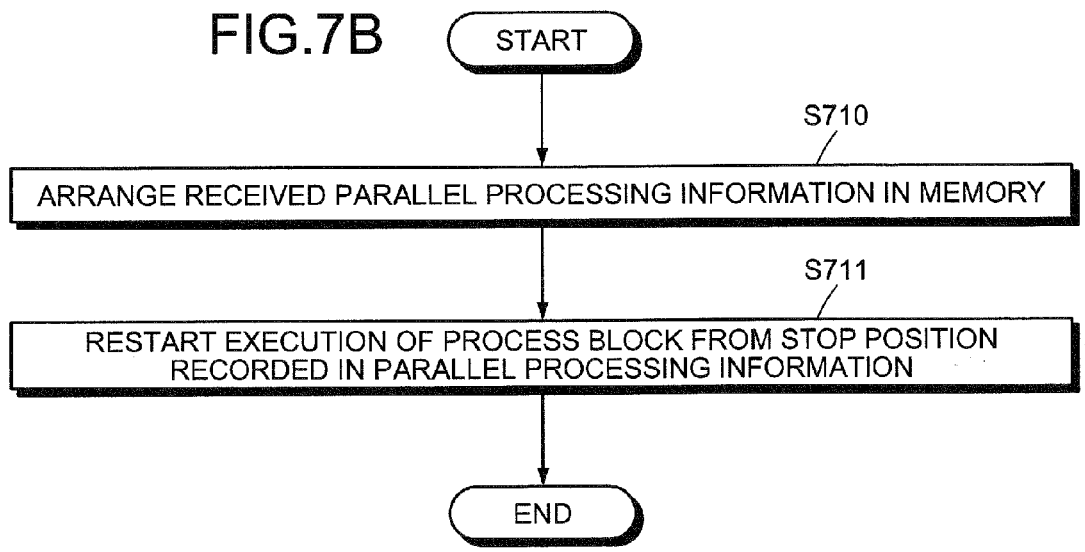

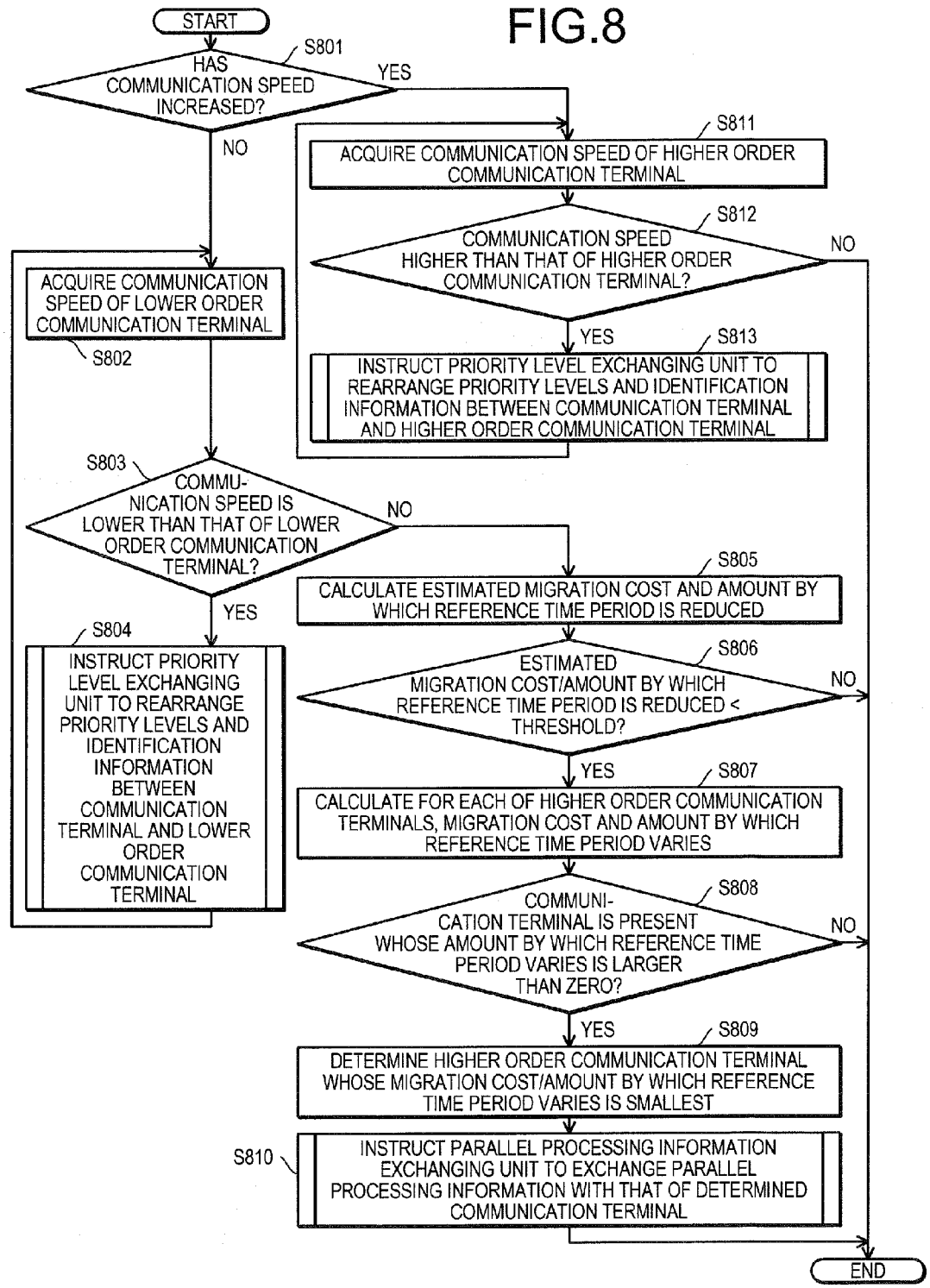

DATA ALLOCATION METHOD AND DATA ALLOCATION SYSTEM

CROSS REFERENCE TO RELATED APPLICATIONS

This application is a continuation application of International Application PCT/JP2011/060473, filed on Apr. 28, 2011 and designating the U.S., the entire contents of which are incorporated herein by reference.

FIELD

The embodiments discussed herein are related to a data allocation method and a data allocation system for allocating data that is shared among plural communication terminals when parallel processing is executed using the terminals.

BACKGROUND

Approaches have been proposed for executing parallel processing using plural communication terminals such as mobile telephones. According to one such approach, a process managing apparatus such as a central server searches for communication terminals capable of accepting parallel processing and requests the communication terminals to execute the parallel processing (see, for example, Japanese Laid-Open Patent Publication No. 2006-201896). Another approach proposes a process managing apparatus that determines a process to be assigned to a communication terminal based on the processing performance and memory capacity of a CPU equipped on the communication terminal (see, for example, Japanese Laid-Open Patent Publication No. 2007-241394).

Conventional communication terminals have a narrow communication band and a long communication delay times and therefore, are not suitable for parallel processing that requires frequent communication sessions among the communication terminals. Consequently, fully distributed parallel processing that requires no communication among the communication terminals, from the start of a process until the completion of the process is assumed.

Recently, developments in communication technology have enabled high speed communication between communication terminals with reduced delays. Consequently, parallel processing in which a communication terminal frequently refers to data produced by another communication terminal to perform processing has become possible. In this case, the communication terminals do not have the same communication performance and therefore, distribution (allocation) of data to the communication terminals has to be performed taking into consideration the communication performance of each communication terminal.

In the field of large-scale computers, etc., in a distributed-memory multi-processor system, a process of determining the data distribution (allocation) is executed taking into consideration the communication performance among processing nodes. However, the communication performance of a communication terminal continually varies due to the factors in the communication environment such as the distance between the communication terminal and a base station and therefore, the data distribution (allocation) has to be executed taking the communication environment into consideration.

However, parallel processing that takes the communication performance of each of the communication terminals into consideration is not possible according to the conventional techniques. Therefore, an approach has been desired where parallel processing can be executed efficiently using plural communication terminals and corresponding to variations of the communication state such as the communication performance and the communication environment.

For example, to migrate data between the communication terminals, communication to deliver the data has to be performed between the communication terminals as well as some processes at each of the communication terminals and mutual communication among the communication terminals such as broadcasting to the other communication terminals that the communication terminal retaining the data has changed. Migration costs, such as time, arise with such data migration. Therefore, the cost for migrating data between communication terminals increases if data is simply exchanged between a communication terminal whose speed is high and that whose speed is low, each time the communication speed of a communication terminal varies. Therefore, it is necessary to cope with variations in communication speed with as few data migrations as possible.

SUMMARY

According to an aspect of an embodiment, a data allocation method is executed by a data allocation system. The data allocation method includes allocating to a first processing apparatus included among plural processing apparatuses and allocating based on a first communication speed of the first processing apparatus, data having communication amount information on a frequency at which the processing apparatuses access the data, and further supplying first priority level information to the first processing apparatus; and exchanging based on variation of a communication speed of at least one processing apparatus among the processing apparatuses, the data or the first priority level information, and data or second priority level information allocated to a second processing apparatus included among the processing apparatuses and having a second communication speed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is a flowchart of the process content of information transmission executed by a parallel processing information exchanging unit;

FIG. 7B is a flowchart of the process content of information reception executed by the parallel processing information exchanging unit; and FIG. 8 is a flowchart of the process content of exchange determination executed by the exchange determining unit in a second embodiment.

DESCRIPTION OF EMBODIMENTS

Embodiments of a data allocation method and a data allocation system will be described in detail with reference to the accompanying drawings. According to the disclosed technique, when data is processed in parallel using plural processing apparatuses, data allocation is executed in advance to divide the data and the data is actually processed in parallel using the plural processing apparatuses. For example, plural communication terminals such as mobile telephones that execute radio communication through a base station can be used as the plural processing apparatuses. It is determined whether any data exchange is necessary between the communication terminals corresponding to variation of the communication state. In this case, it is determined whether the data exchange is suitable, using information such as the communication speeds of a given communication terminal and another communication terminal, and thereafter, the data is exchange. As a result, no data exchange is wastefully executed and the parallel processing is efficiently executed in the entire system.

Figure 1:
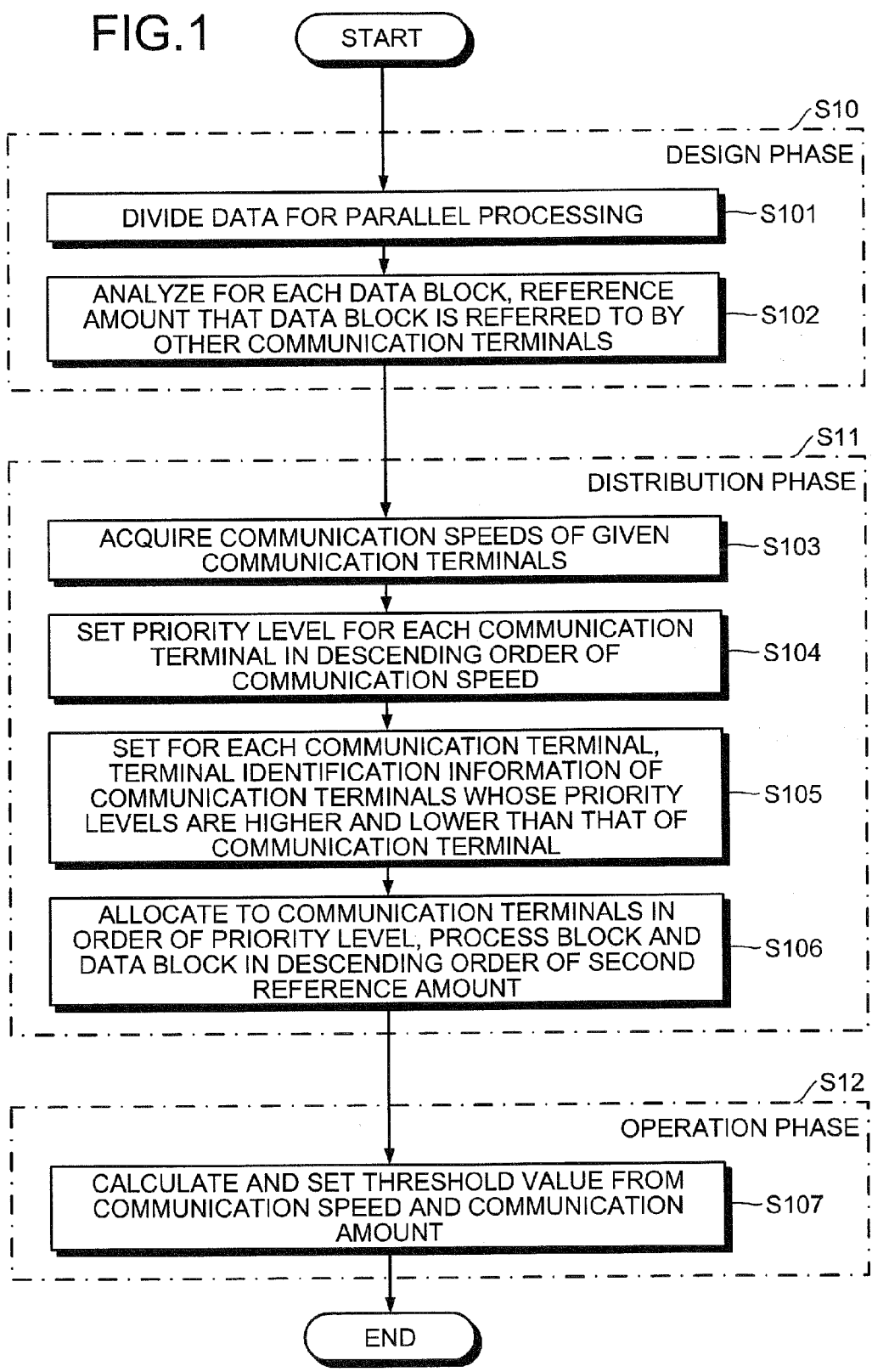
FIG. 1 is a flowchart of an overview of processes of a data allocation method according to a first embodiment.

FIG. 1 is a flowchart of an overview of processes of a data allocation method according to a first embodiment. Execution of the data allocation includes three phases, including a design phase (step S10) to divide a process and data for the parallel processing; a distribution phase (step S11) to determine distribution of the data to the plural processing apparatuses (communication terminals) when the parallel processing is started, and an operation phase (step S12) to monitor the communication state of the plural communication terminals and execute reallocation after the parallel processing is started.

The design phase (step S10) is a process step executed by a computer apparatus such as a PC when a program is produced, etc. The computer apparatus divides the data for the parallel processing (step S101). The computer apparatus analyzes the process to be subject to parallel processing, and divides the process and the data by the number of communication terminals that are to perform the parallel processing such that the plural communication terminals can execute the parallel processing using the resulting process blocks and data block. The computer apparatus analyzes for each data block, as communication amount information, a reference amount that the data block is referred to by other communication terminals (step S102). The communication amount information is information concerning the frequency at which the plural processing apparatuses access the data block. The total reference amount by other process blocks excluding the reference amount of the process block correlated with the data block as a pair is calculated and recorded as a second reference amount.

The distribution phase (step S11) is a process step executed by a parent communication terminal that starts the parallel processing. At the distribution phase (step S11), the parent communication terminal determines as communication terminals for the parallel processing, communication terminals for allocation. The parent communication terminal selects communication terminals capable of accepting the parallel processing, the number of the communication terminals selected is the number set at the design phase (step S10).

The parent communication terminal acquires the communication speeds of the selected communication terminals (step S103) and allocates to each communication terminal in descending order of communication speed, a paired data block and process block in descending order of second reference amount of the data block. For example, the parent communication terminal sets a priority level for each of the communication terminals in descending order of communication speed (step S104) and sets for each communication terminal, terminal identification information ("higher order terminal identification information" and "lower order terminal identification information") to access other communication terminals whose priority levels are higher and lower than that of the communication terminal (step S105). The priority level and the terminal identification information configure "priority level information". The parent communication terminal allocates to each of the communication terminals in order of priority level (that is, descending order of communication speed), a process block and a data block in descending order of second reference amount (step S106).

As to the process steps at the distribution phase (step S11), not only the parent communication terminal starting the parallel processing executes the process steps but also a higher order apparatus among the plural communication terminals such as, for example, the base station or a process managing apparatus connected to the base station may collect information concerning each of the communication terminals and may execute the process steps.

The operation phase (step S12) is a process step executed by each of the communication terminals that execute the parallel processing. Each communication terminal allocated with a process block and a data block at step S106 calculates a threshold value from the communication speed and the communication amount, and sets the calculated threshold value in the communication terminal (step S107). To do this, the communication terminal monitors the communication speeds of the communication terminal and the higher order and the lower order communication terminals thereof.

Although details of the process will be described later, the communication terminal monitors the communication speed of the communication terminal (a first processing apparatus) and the communication speeds of the other higher order and lower order communication terminals (second processing apparatuses) and consequently, when any one of the communication speeds varies, the communication terminal executes processes such as that of mutually exchanging the priority levels and mutually interchanging the process blocks and the data block between the communication terminal and the other communication terminal. Thus, the parallel processing is executed by the plural communication terminals.

For example, if the communication speed of the communication terminal exceeds that of the higher order communication terminal, the communication terminal executes an exchange of the priority levels with the higher order communication terminal and a rearrangement of the terminal identification information of the communication terminal (higher order terminal identification information and lower order terminal identification information). If the communication speed of the communication terminal is lower than that of the lower order communication terminal thereof while is not lower than the threshold value, the communication terminal also executes the exchange of the priority levels with the lower order communication terminal and the rearrangement of the terminal identification information.

If the communication speed of the communication terminal is lower than a threshold value, the communication terminal compares the communication speeds, and the threshold values of the allocated data block, between the communication terminal and the higher order communication terminal. If the data exchange sets the communication speeds of the communication terminals to be within a threshold value range, the process block and the data block of the communication terminal are exchanged, as the pair, with those of the higher order communication terminal. If the exchange does not set the communication speeds to be within the threshold value range, the communication terminal acquires the terminal identification information (higher order terminal identification information) of the higher order communication terminal retained by the higher order communication terminal, and executes the same comparison with those of a further higher order communication terminal. If the communication terminal repeats the comparison with higher order communication terminals up to the highest order one (whose priority level is "1") and can find no communication terminal whose process block and the data block are exchangeable, the communication terminal determines that the performance at the time of the start of the parallel processing cannot be maintained, and the parent communication terminal starting the parallel processing again determines the necessity of the parallel processing. If the parent communication terminal determines that the parallel processing is necessary, the parent communication terminal executes a change of the distribution similar to executing the initial distribution.

Figure 2:
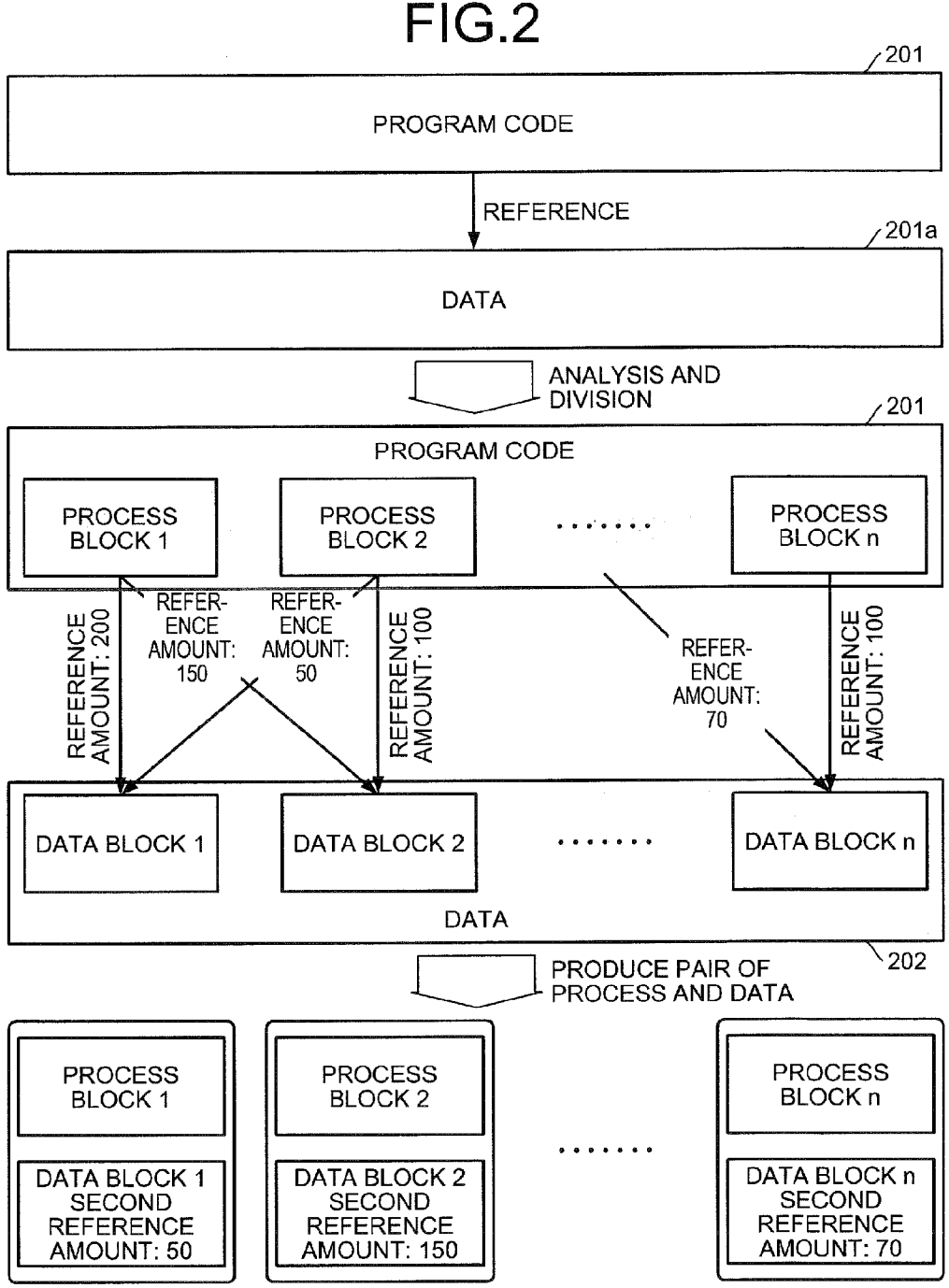
FIG. 2 is an explanatory diagram of process steps of division of a process and data at a design phase.

FIG. 2 is an explanatory diagram of process steps of the division of the process and the data at the design phase. For the division of the process, program code 201 of the process to be divided is referred to; data 201a is analyzed; and the process is divided into plural process blocks (process blocks 1, 2, ..., n) that can be subject to parallel processing. Data 202 used by the process blocks 1 to n is analyzed and is divided into plural data blocks (data blocks 1, 2, ..., n) and the data amount and the data block that each of the process blocks 1 to n accesses is analyzed as the reference amount.

For each process block, the data block referred to most by the process block (i.e., having the largest reference amount for the process block) is paired with the process block, and the total amount that the data block is referenced by process blocks other than the paired process block (i.e., the total of the reference amounts from the process blocks other than the paired process block) is set as the second reference amount.

In the example depicted in FIG. 2, the process block 1 has a reference amount of 200 for the data block 1 and a reference amount of 150 for the data block 2. Therefore, the process block 1 and the data block 1 are paired. In addition to the process block 1, the data block 1 is also accessed by the process block 2 by the reference amount of 50 and therefore, the second reference amount of the data block 1 is 50. Similarly, the process block 2 has a reference amount that is largest for the data block 2 and therefore, the process block 2 and the data block 2 are paired. The second reference amount of the data block 2 is 150 from the process block 1.

At the distribution phase (step S11), various types of information are coupled with each other as "parallel processing information", such as information that records the process block obtained at the design phase (step S10) (corresponding to the program block), the data block paired with the process block, and the second reference amount of the data block. The parallel processing information, the process and the data blocks are allocated to the communication terminals.

Figure 3:
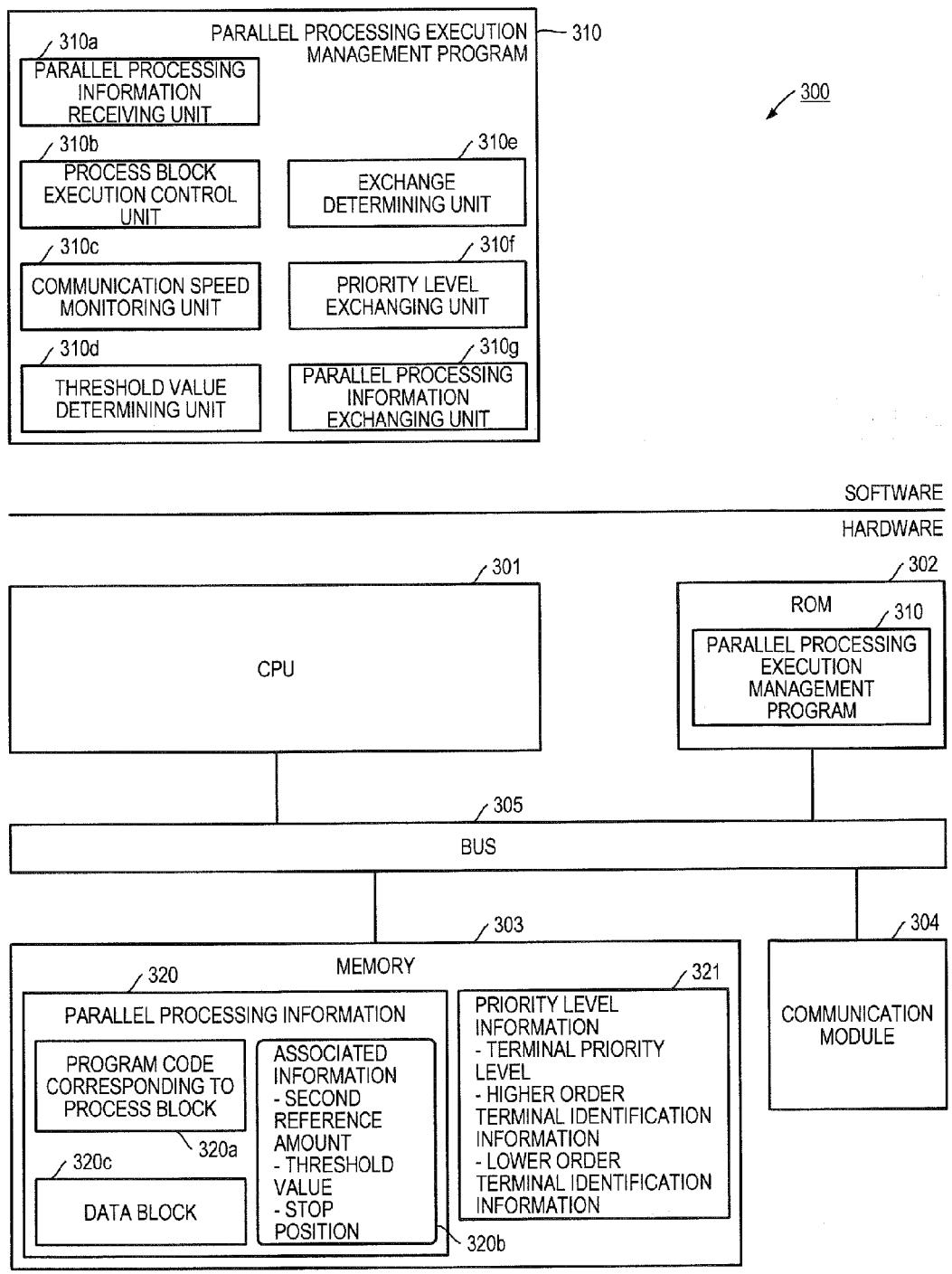
FIG. 3 is a block diagram of an example of a configuration of a communication terminal included in the data allocation system according to the first embodiment.

FIG. 3 is a block diagram of an example of a configuration of a communication terminal included in the data allocation system according to the first embodiment. As described, the communication terminal 300 wirelessly transmits to and receives from the parent communication terminal 300 via the base station, the data to be subject to parallel processing and the information used for the parallel processing. The communication terminal 300 includes software and hardware. The hardware includes a CPU 301, a ROM 302, memory 303 such as RAM, a communication module 304, and a bus (BUS) 305 that connects the units from the CPU 301 to the communication module 304. The software is configured by a parallel processing execution management program 310 and the program 310 is recorded in advance in the ROM 302.

The CPU 301 executes the parallel processing execution management program 310 recorded in the ROM 302 and thereby, executes the parallel processing of the data using the plural communication terminals 300. In this case, the CPU 301 executes the parallel processing using the memory 303 as a work area. During the execution of the parallel processing, the CPU 301 mutually communicates with the parent communication terminal 300 via the base station, by using the communication module 304, and transmits to and receives from the other communication terminals 300, the information necessary for the execution of the parallel processing.

The memory 303 stores the parallel processing information 320 and priority level information 321 that are necessary for the parallel processing. The priority level information 321 includes the parallel processing information 320 received via the communication module 304, and the priority level information 321 produced based on the parallel processing information 320 by the communication terminal 300 that receives the parallel processing information 320.

The parallel processing execution management program 310 includes a parallel processing information receiving unit 310a, a process block execution control unit 310b, a communication speed monitoring unit 310c, a threshold value determining unit 310d, an exchange determining unit 310e, a priority level exchanging unit 310f, and an parallel processing information exchanging unit 310g.

The parallel processing information receiving unit 310a captures the parallel processing information 320 received by the communication module 304. The process block execution control unit 310b executes a process that corresponds to the process block allocated to the communication terminal 300. The communication speed monitoring unit 310c monitors the communication speed of the communication terminal 300. The threshold value determining unit 310d determines the value that corresponds to the communication speed, etc. The exchange determining unit 310e determines based on the variation of the communication speed, whether the priority levels or the parallel processing information 320 are to be exchanged between the communication terminal 300 and another communication terminal. If the exchange determining unit 310e determines that the priority levels are to be exchanged, the priority level exchanging unit 310f exchanges the priority levels set in the communication terminal 300 and another communication terminal with each other. If the exchange determining unit 310e determines that the parallel processing information 320 is to be exchanged, the parallel processing information exchanging unit 310g exchanges the parallel processing information 320 set in the communication terminal 300 and in another communication terminal with each other.

The parallel processing information 320 includes program code 320a corresponding to the process block; associated information 320b such as the second reference amount (communication amount), the threshold value, and a stop position of the process; and the data block 320c to be processed. The priority level information 321 includes the priority level of the communication terminal 300, higher order terminal identification information of a communication terminal whose priority level is higher than that of the communication terminal 300, and lower order terminal identification information of a communication terminal whose priority level is lower than that of the communication terminal 300.

In the communication terminal 300 having the above configuration, the CPU 301 executes the parallel processing execution management program 310. When the parent communication terminal 300 starting the parallel processing allocates the parallel processing information 320 to the communication terminal 300, the parallel processing information receiving unit 310a of the parallel processing execution management program 310 arranges in the memory 303, the parallel processing information 320 transmitted through the communication module 304 and records in the memory 303, the priority level of the communication terminal 300 and the terminal identification information (the terminal identification information of the higher order communication terminal for the communication terminal 300 and the terminal identification information of the lower order communication terminal therefor) that configure the priority level information 321 transmitted together with the parallel processing information 320.

Thereafter, the threshold value determining unit 310d calculates the threshold value and records the calculated threshold value into the parallel processing information 320 and the process block execution control unit 310b executes the process that corresponds to the allocated process block. After the start of the execution of the process, the communication speed monitoring unit 310c monitors the communication speed using the communication module 304. If the communication speed monitoring unit 310c determines that the communication speed varies, the exchange determining unit 310e determines whether only the priority levels are to be exchanged, the parallel processing information 320 are to be exchanged, or no exchange is to be executed. If the exchange determining unit 310e determines that only the priority levels are exchanged, the priority level exchanging unit 310f exchanges the priority level information between the communication terminal 300 and the other communication terminal 300. If the exchange determining unit 310e determines that the parallel processing information is exchanged, the parallel processing information exchanging unit 310g exchanges the parallel processing information between the communication terminal 300 and the other communication terminal 300.

Figure 4:
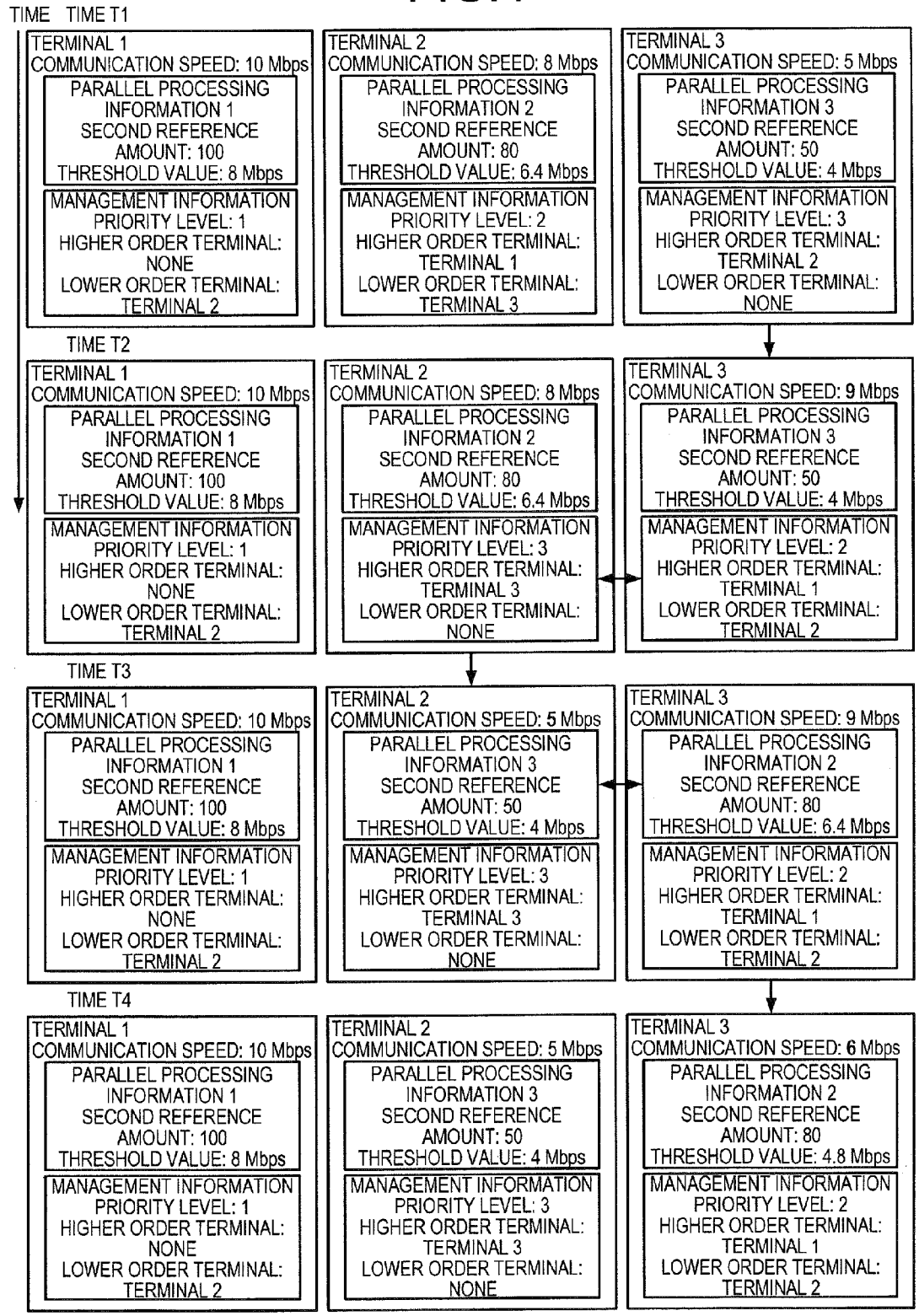
FIG. 4 is an explanatory diagram of an exchange process executed between the communication terminals when communication speed varies.

FIG. 4 is an explanatory diagram of an exchange process executed between the communication terminals when the communication speed varies. As described below, the "exchange" refers to both the exchange of the priority level of the priority level information 321 and the exchange of the parallel processing information 320. The depicted example is an example where three communication terminals 300 execute the parallel processing. In FIG. 4, a time axis indicates the elapse of time in a downward direction. In FIG. 4, each of the communication terminals is labeled as "terminal" and a higher (lower) order communication terminal is labeled as "higher (lower) terminal".

The state at a time T1 is the state immediately after the execution of the allocation, and it is assumed that the communication speeds of the communication terminals in this state are 10 Mbps, 8 Mbps 2, and 5 Mbps respectively for communication terminals 1, 2, and 3. Thus, the priority level of the communication terminal 1 having the highest communication speed is "1" and parallel processing information 1 whose second reference amount is the largest is allocated to the communication terminal 1. In this case, the threshold value is set to be, for example, 8 Mbps, which is a value corresponding to 80% of the communication speed at the time of the allocation. For the communication terminal 1, no communication terminal is present whose priority level is higher than that of the communication terminal 1 and therefore, "none" is set for the higher order communication terminal. The communication terminal 2 whose communication speed is the second highest is set to be the lower order communication terminal.

Similarly, for the communication terminal 2, the parallel processing information 2 whose second reference amount is the second largest is allocated thereto; the threshold value is 80% of 8 Mbps, which is 6.4 Mbps; the priority level is "2"; the higher order communication terminal is the communication terminal 1; and the lower order communication terminal is the communication terminal 3. For the communication terminal 3, the parallel processing information 3 is allocated thereto; the threshold value is 4 Mbps; the priority level is "3"; the higher order communication terminal is the communication terminal 2; and the lower order communication terminal is "none" because three communication terminals execute the parallel processing in this example.

It is assumed that, at a time T2, the communication speed of the communication terminal 3 increases and changes to 9 Mbps. In this case, the communication speed monitoring unit 310c detects the increase in the communication speed. Because the communication speed increases, the exchange determining unit 310e acquires from the communication terminal 2, the communication speed of the communication terminal 2, which is the higher order communication terminal. The communication speed of the communication terminal 2 is 8 Mbps and does not vary and therefore, the communication speed of the communication terminal 3 exceeds that of the communication terminal 2. Thus, the exchange determining unit 310e of the communication terminal 3 determines that the priority levels are to be exchanged between the communication terminals 2 and 3. In response, the priority level exchanging unit 310f acquires the priority level 2 of the communication terminal 2 and the information concerning the higher order communication terminal 1, sets the priority level of the communication terminal 3 to be "2" and the higher order communication terminal to be "1", and further sets the communication terminal 2 to be the lower order communication terminal. The priority level exchanging unit 310f notifies the communication terminal 2 of the priority level of the communication terminal 3 before the change and "none" for the lower order communication terminal. The communication terminal 2 receives the notification and sets the priority level to be "3", changes the value for the lower order communication terminal to a value indicating "none", and changes the higher order communication terminal to the communication terminal 3.

It is assumed that, thereafter, at time T3, the communication speed of the communication terminal 2 decreases to 5 Mbps. Thus, the communication speed of the communication terminal 2 is lower than the threshold value that is recorded in the parallel processing information 2. In this case, the communication terminal 2 acquires the threshold value in the parallel processing information 3 allocated to the communication terminal 3 that is the higher order communication terminal of the communication terminal 2. The threshold value in the parallel processing information 2 allocated to the communication terminal 2 whose communication speed is 5 Mbps is 6.4 Mbps whereas the threshold value in the parallel processing information 3 allocated to the communication terminal 3 whose communication speed is 9 Mbps is 4 Mbps. Therefore, when the parallel processing information is exchanged between the communication terminals 2 and 3, the communication speeds are each within the threshold value.

The exchange determining unit 310e of the communication terminal 3 determines that the parallel processing information 320 are to be exchanged.

The parallel processing information exchanging unit 310g of the communication terminal 2 causes the process block execution control unit 310b to stop the execution of the process block under execution. When the execution of the process block is stopped, the parallel processing information exchanging unit 310g records into the associated information 320b of the parallel processing information 320, the stop position in the program code; transmits to the communication terminal 3, the parallel processing information 320 of the communication terminal 2; and requests the communication terminal 3 to transmit thereto the parallel processing information 320. The communication terminal 2 receives the parallel processing information 320 from the communication terminal 3, arranges the parallel processing information 320 in the memory 303, and restarts the execution of the process block from the stop position recorded in the associated information 320b of the parallel processing information 320.

According to the above process, when the communication speed increases, no exchange of the parallel processing information 320 is executed and therefore, a communication terminal like the communication terminal 2 at the time T3 may be present that has the parallel processing information 320 whose second reference amount is smaller than that of the communication terminal 2, among the communication terminals whose communication speeds are higher. A communication terminal whose communication speed is higher is searched for using the priority level and it is determined based on the threshold value whether the exchange can be executed. In this manner, by using the threshold value, another communication terminal for the parallel processing with which the processing performance for the data can be secured can easily be determined even without obtaining from the other communication terminals whose communication speeds are higher, the parallel processing information 320 whose second reference amount is the smallest.

It is assumed that, at time T4, the communication speed of the communication terminal 3 decreases to 6 Mbps. Thus, the threshold value in the parallel processing information 1 allocated to the communication terminal 1, which is the higher order communication terminal of the communication terminal 3, is 8 Mbps, which is lower than the threshold value in the parallel processing information 2 allocated to the communication terminal 3 and therefore, the threshold value is not satisfied by exchanging the pieces of parallel processing information 1 and 2 with each other. In this case, redistribution of the parallel processing information 320 in the communication terminal 3 and a higher order communication terminal (in this case, the communication terminal 1) is requested to the parent communication terminal that started the parallel processing.

To redistribute the data, the plural communication terminals for the parallel processing suspend execution of the respective process blocks; and the communication terminal that started the parallel processing collects the parallel processing information 320 and allocates the parallel processing information 320 in descending order of second reference amount, to the communication terminals in descending order of communication speed similar to the distribution phase. The communication terminals allocated with the parallel processing information 320 each set the threshold value and resume the execution of the process block from the stop position recorded in the associated information 320b of the parallel processing information 320. In this example, the priority level and the communication speed of the communication terminal 1 do not vary and therefore, the parallel processing information 1 is continuously allocated thereto and the threshold value also remains at 8 Mbps. The parallel processing information 2 is allocated to the communication terminal 3 and because the current communication speed is 6 Mbps, the threshold value is changed to 80% thereof, i.e., 4.8 Mbps.

In the above processing example, no change of the communication terminal is executed during the redistribution. However, when no sufficient performance can be expected with the current plural communication terminals for the parallel processing, the communication terminals for the parallel processing are reselected similar to the selection executed at the distribution phase, or depending on the case, it is determined that execution of the parallel processing is futile and therefore, the parallel processing itself may be cancelled.

Figure 5:
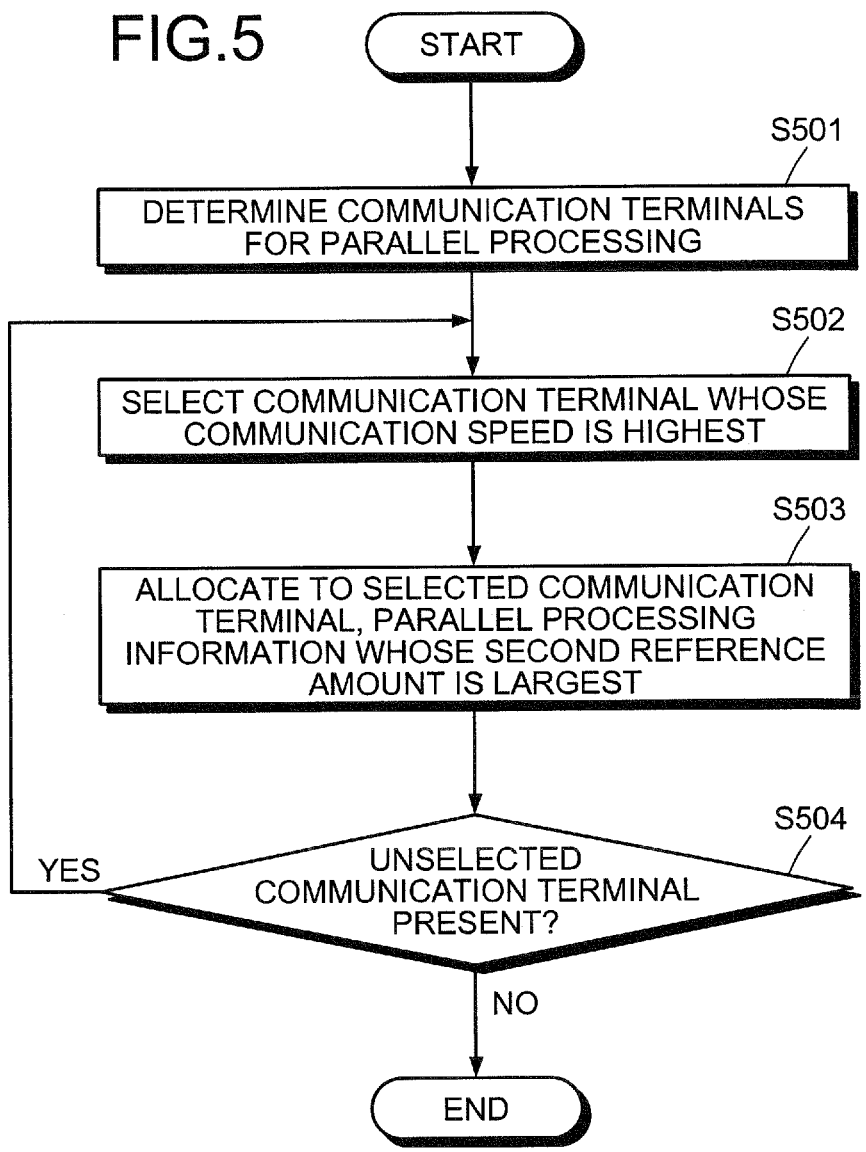
FIG. 5 is a flowchart of the process content executed by the communication terminal that starts parallel processing.

FIG. 5 is a flowchart of the process content executed by the communication terminal that starts the parallel processing. The processes will be described that are executed by the communication terminal 300 starting the parallel processing at the distribution phase (step S11). The starting communication terminal 300 determines the plural communication terminals 300 for the parallel processing (step S501). For this determination, any one of the techniques disclosed in the above Publications, etc., is usable and, for example, the communication terminals 300 each having the performance capable of accepting the parallel processing only have to be selected for the number of the communication terminals set at the design phase (step S10). It is assumed that each of all the selected communication terminals 300 has the processing performance and the memory capacity capable of accepting the process block and the data block divided at the design phase (step S10).

The starting communication terminal 300 selects an unselected communication terminal 300 whose communication speed is the highest, from the selected plural communication terminals 300 (step 502) and allocates to the selected communication terminal 300, parallel processing information 320 whose second reference amount is the largest (step S503). Thereafter, the starting communication terminal 300 determines whether any unselected communication terminal 300 is present (step S504). If the starting communication terminal 300 determines that an unselected communication terminal 300 is present (step S504: YES), the starting communication terminal 300 returns to the process at step S502 and executes the same processes. If the starting communication terminal 300 determines that no unselected communication terminal 300 is present (step S504: NO), the starting communication terminal 300 causes the processes at the distribution phase to come to an end. The same processes as those of FIG. 5 are also executed for the redistribution described above.

Figure 6:
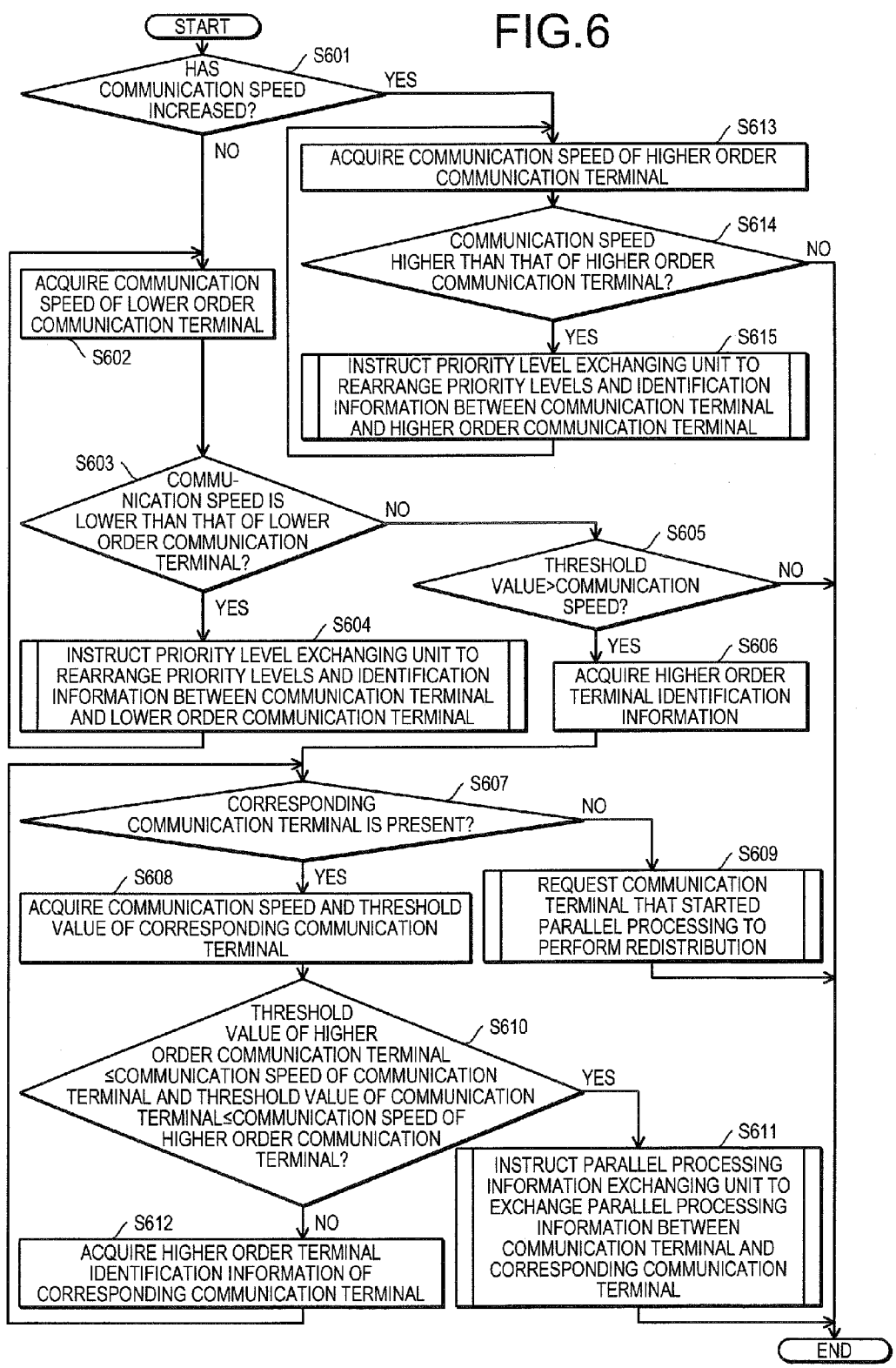
FIG. 6 is a flowchart of the process content of exchange determination executed by an exchange determining unit.

FIG. 6 is a flowchart of the process content of the exchange determination executed by the exchange determining unit. The communication speed monitoring unit 310c of the communication terminal 300 determines whether the communication speed has increased (step S601). If the communication speed monitoring unit 310c determines that the communication speed has not increased (step S601: NO), the communication speed monitoring unit 310c acquires the communication speed of the lower order communication terminal (step S602) and determines whether the communication speed is lower than that of the lower order communication terminal (step S603). If the communication speed monitoring unit 310c determines that the communication speed is lower than that of the lower order communication terminal (step S603: YES), the communication speed monitoring unit 310c instructs the priority level exchanging unit 310f to rearrange the priority levels and the identification information of the priority level information 321 between the communication terminal 300 and the lower order communication terminal (step S604), and returns to the process at step S602.

On the other hand, if the communication speed monitoring unit 310c determines at step S603 that the communication speed is greater than or equal to that of the lower order communication terminal (step S603: NO), the communication speed monitoring unit 310c determines whether the threshold value is higher than the communication speed (step S605). If the communication speed monitoring unit 310c determines that the threshold value is higher than the communication speed (step S605: YES), the communication speed monitoring unit 310c acquires the higher order terminal identification information from the priority level information 321 (step S606). However, if the communication speed monitoring unit 310c determines that the threshold value is less than or equal to the communication speed (step S605: NO), the communication speed monitoring unit 310c causes the process to come to an end.

In response to the execution of the process at step S606, the exchange determining unit 310e determines whether a communication terminal corresponding to the higher order communication terminal is present (step S607). If the exchange determining unit 310e determines that a communication terminal corresponding thereto is present (step S607: YES), the exchange determining unit 310e acquires the communication speed and the threshold value of the corresponding communication terminal (step S608). If the exchange determining unit 310e determines that no communication terminal corresponding thereto is present (step S607: NO), the exchange determining unit 310e requests the parent communication terminal that started the parallel processing to perform redistribution (step S609) and causes the process to come to an end.

After the execution of the process at step S608, the exchange determining unit 310e determines whether the conditions that the threshold value of the higher order communication terminal is less than or equal to the communication speed of the communication terminal 300 and the threshold value of the communication terminal 300 is less than or equal to the communication speed of the higher order communication terminal are satisfied (step S610). If the exchange determining unit 310e determines that the conditions are satisfied (step S610: YES), the exchange determining unit 310e instructs the parallel processing information exchanging unit 310g to exchange the parallel processing information 320 between the communication terminal 300 and the corresponding communication terminal (step S611) and causes the process to come to an end. If the exchange determining unit 310e determines at step S610 that the condition is not satisfied (step S610: NO), the exchange determining unit 310e acquires the higher order terminal identification information of the priority level information 321 of the corresponding communication terminal (step S612) and returns to the process at step S607.

If the communication speed monitoring unit 310c determines at step S601 that the communication speed has increased (step S601: YES), the communication speed monitoring unit 310c acquires the communication speed of the higher order communication terminal (step S613) and determines whether the communication speed is higher than that of the higher order communication terminal (step S614). If the communication speed monitoring unit 310c determines that the communication speed is higher than that of the higher order communication terminal (step S614: YES), the communication speed monitoring unit 310c instructs the priority level exchanging unit 310f to rearrange the priority levels and the identification information between the communication terminal and the higher order communication terminal (step S615) and returns to the process at step S613. On the other hand, if the communication speed monitoring unit 310c determines at step S614 that the communication speed is less than or equal to that of the higher order communication terminal (step S614: NO), the communication speed monitoring unit 310c causes the process to come to an end.

FIG. 7A is a flowchart of the process content of the information transmission executed by the parallel processing information exchanging unit. The parallel processing information exchanging unit 310g suspends the execution of the process block when the exchange determining unit 310e instructs an exchange by transmitting the parallel processing information 320 to another communication terminal 300 (step S701). The parallel processing information exchanging unit 310g records into the associated information 320b, the position up to which the program code is processed at the time of the suspension (step S702), transmits the parallel processing information 320 to the instructed communication terminal (step S703), requests the instructed communication terminal to transmit the parallel processing information 320 for exchange (step S704), and causes the process to come to an end.

FIG. 7B is a flowchart of the process content of the information reception executed by the parallel processing information exchanging unit. The parallel processing information exchanging unit 310g receives the parallel processing information 320 from another communication terminal and arranges the received parallel processing information 320 in the memory 303 (step S710), restarts the execution of the process block from the stop position recorded in the associated information 320b of the parallel processing information 320 (step S711), and causes the process to come to an end.

According to the first embodiment, the threshold value and the rank (the priority level) of the communication speed in the plural communication terminals executing the parallel processing are set in each of the plural communication terminals. When the communication speed of a communication terminal varies, it is determined using the threshold value, whether information such as the communication speed of another communication terminal to be obtained. If it is determined that information related to another communication terminal is to be obtained, the other communication terminal from which the information is to be obtained is determined based on the priority level of each of the communication terminals. If the communication speed obtained from the other communication terminal is within the threshold value range, the data is not migrated and only the rank (the priority level) is updated, and only when the communication speed is lower than the threshold value, the data is migrated. Thereby, optimal data distribution is not executed corresponding to the communication speeds of the communication terminals, but rather the performance in the initial state or during the redistribution executed immediately previously is maintained by as few data migrations as possible. Consequently, any increase in the cost associated with data migration can be suppressed.

For the migration of the data, when a communication terminal is present among communication terminals whose rank (priority level) is higher that a given communication terminal and with which a data exchange causes the threshold values of both of the communication terminals to be within the threshold values, the data exchange is executed between these communication terminals; and, when no communication terminal is present with which the exchange can be executed, the data are redistributed and the threshold values are reset. Therefore, the parallel processing can be executed efficiently, taking into consideration the communication state of the plural communication terminals.

In a second embodiment, similar to the first embodiment, the process is divided and the process blocks are distributed in descending order of speed of the communication terminal 300. The second embodiment differs from the first embodiment in that the threshold value set in advance corresponding to the communication speed is not used and, instead, the size of the parallel processing information 320 is recorded into the parallel processing information 320 when the process is divided (at the design phase, step S10 of FIG. 1). For each of the communication terminals 300, the communication speed thereof is recorded into the priority level information 321, at the distribution phase (step S11).

At the operation phase (step S12), if the communication speed of the communication terminal 300 varies and increases, the same processes as those in the first embodiment are executed. On the other hand, if the speed decreases, an exchange of the priority levels is executed similar to the first embodiment. An estimated migration cost and the amount by which the reference time period is reduced are calculated. If "the estimated migration cost÷the amount by which the reference time period is reduced" is lower than a threshold value set in advance, it is determined whether the parallel processing information 320 is to be migrated. The estimated migration cost is calculated by "the size of the parallel processing information 320÷the communication speed". The amount by which the reference time period is reduced is calculated by "the second reference amount÷(the communication speed at the time of distribution−the current communication speed)".

Concerning the migration determination for the parallel processing information 320, the migration cost and the amount by which the reference time period varies are calculated for each of the higher order communication terminals; and the migration is executed with the communication terminal whose amount by which the reference time period varies is larger than zero, and whose "migration cost÷the amount by which the reference time period varies" becomes the smallest. The migration cost is calculated by "(the size of the parallel processing information 320 of the communication terminal+ the size of the parallel processing information 320 of the candidate communication terminal for the moving)÷the communication speed of the communication terminal". The amount by which the reference time period varies is calculated by "(the second reference amount of the data block 320c of the communication terminal−the second reference amount of the data block 320c of the candidate communication terminal for the migration)÷the communication speed of the communication terminal+(the second reference amount of the data block 320c of the candidate communication terminal for the migration−the second reference amount of the data block 320c of the communication terminal)÷the communication speed of the candidate communication terminal for the migration". When the exchange is executed, each of the communication terminals records the communication speed at the time of the exchange into the priority level information 321 as its communication speed at the time of the disposition.

FIG. 8 is a flowchart of the process content of the exchange determination executed by the exchange determining unit in the second embodiment. The communication speed monitoring unit 310c of the communication terminal 300 determines whether the communication speed has increased (step S801). If the communication speed monitoring unit 310c determines that the communication speed has not increased (step S801: NO), the communication speed monitoring unit 310c acquires the communication speed of the lower order communication terminal (step S802) and determines whether the communication speed is lower than that of the lower order communication terminal (step S803). If the communication speed monitoring unit 310c determines that the communication speed is lower than that of the lower order communication terminal (step S803: YES), the communication speed monitoring unit 310c instructs the priority level exchanging unit 310f to rearrange the priority levels and the identification information with the lower order communication terminal (step S804) and returns to the process at step S802.

On the other hand, if the communication speed monitoring unit 310c determines as the result of the determination at step S803 that the communication speed is greater than or equal to that of the lower order communication terminal (step S803: NO), the communication speed monitoring unit 310c calculates the estimated migration cost and the amount by which the reference time period is reduced (step S805) and determines whether "the estimated migration cost÷the amount by which the reference time period is reduced" is lower than the threshold value set in advance (step S806). If the communication speed monitoring unit 310c determines that "the estimated migration cost÷the amount by which the reference time period is reduced" is lower than the threshold value (step S806: YES), the communication speed monitoring unit 310c calculates for each of all the higher order communication terminals, the migration cost and the amount by which the reference time period varies (step S807) and determines whether a communication terminal is present whose amount by which the reference time period varies is larger than zero (step S808). If the communication speed monitoring unit 310c determines that such a communication terminal is present (step S808: YES), the communication speed monitoring unit 310c determines the higher order communication terminal whose "the migration cost÷the amount by which the reference time period varies" is the smallest (step S809), instructs the parallel processing information exchanging unit 310g to exchange the parallel processing information 320 with that of the determined communication terminal (step S810), and causes the process to come to an end.

If the determination result is "NO" at each of steps S806 and S808 (steps S806 and S808: NO), the communication speed monitoring unit 310c causes the process to come to an end.

If the communication speed monitoring unit 310c determines at step S801 that the communication speed has increased (step S801: YES), the communication speed monitoring unit 310c acquires the communication speed of the higher order communication terminal (step S811) and determines whether the communication speed is higher than the communication speed of the higher order communication terminal (step S812). If the communication speed monitoring unit 310c determines that the communication speed is higher than the communication speed of the higher order communication terminal (step S812: YES), the communication speed monitoring unit 310c instructs the priority level exchanging unit 310f to rearrange the priority levels and the identification information with the higher order communication terminal (step S813) and returns to the process at step S811. On the other hand, if the communication speed monitoring unit 310c determines at step S812 that the communication speed is less than or equal to the communication speed of the higher order communication terminal (step S812: NO), the communication speed monitoring unit 310c causes the process to come to an end.

According to the second embodiment, the exchange of the priority levels is determined not by using the fixed threshold value that corresponds to the communication speed but by using the information on the estimated migration cost and the amount by which the reference time period is reduced when the communication speed varies. The information on the estimated migration cost and the amount by which the reference time period is reduced is determined using the communication speed at the operation phase and therefore, the parallel processing can be executed more efficiently corresponding to the variation of the actual communication speed.

The communication terminals described in the embodiments have been described taking the example of the mobile telephones that communicate via the base station by radio. However, application of the technique disclosed herein is not limited to the mobile telephone network. For example, the technique can be similarly applied to communication terminals each capable of switching and connecting to an access point such as that of a radio LAN. In this case, the communication speed of the mobile telephone network and that of the radio LAN may differ from each other and therefore, as to the threshold value described in the first embodiment corresponding to the above, for example, values different from each other may be set for the mobile telephone network and the radio LAN at the distribution phase (step S11) and the process may be executed using the threshold value that corresponds to the communication speed of the radio path at the operation phase (step S12). In addition, a common threshold value may also be used regardless of the type of the radio path.

According to the technique disclosed as above, even when the communication state varies of the communication terminals currently executing the parallel processing, migration of the data is not immediately executed and the determination concerning the migration is executed after acquiring information such as the degree of the variation of the communication speed of the communication terminal and the communication speeds of the other communication terminals. Therefore, the processing can be executed without executing any wasteful processing. In particular, the performance at the time of the data division executed at the time of the start of the execution of the parallel processing, etc., can be maintained by migration as few data as possible; any increase of the migration cost (time period) associated with the data moving sessions can be suppressed; and the efficiency can be improved for all of the parallel processing executed by the plural communication terminals.

The data allocation method and the data allocation system effect efficient parallel processing that corresponds variations in the communication state of plural communication apparatuses.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data allocation method that is executed by a data allocation system, the data allocation method comprising:
    allocating to a first processing apparatus included among a plurality of processing apparatuses and allocating based on a first communication speed of the first processing apparatus, data having communication amount information on a frequency at which the processing apparatuses access the data, and further supplying first priority level information to the first processing apparatus; and
    exchanging based on variation of a communication speed of at least one processing apparatus among the processing apparatuses, the data or the first priority level information, and data or second priority level information allocated to a second processing apparatus included among the processing apparatuses and having a second communication speed.

2. The data allocation method according to claim 1, wherein
    when the first communication speed is higher than a third communication speed of a third processing apparatus included among the processing apparatuses, the frequency indicated by communication amount information of the data allocated to the first processing apparatus is higher than a frequency indicated by communication amount information of data allocated to the third processing apparatus.

3. The data allocation method according to claim 1, wherein
    when the first communication speed is higher than a third communication speed of a third processing apparatus, a priority level indicated by the first priority level information is higher than a priority level indicated by third priority level information supplied to the third processing apparatus.

4. The data allocation method according to claim 1, wherein
    the exchanging includes exchanging the first priority level information and the second priority level information, when the second communication speed is higher than the first communication speed.

5. The data allocation method according to claim 1, further comprising
    comparing the first communication speed and a second threshold value that corresponds to the second communication speed, when the first communication speed is lower than a first threshold value that corresponds to the first communication speed and a priority level indicated by the second priority level information is higher than a priority level indicated by the first priority level information.

6. The data allocation method according to claim 5, wherein
    the exchanging includes exchanging the data of the first processing apparatus and the data of the second processing apparatus, when the first communication speed is higher than the second threshold value.

7. The data allocation method according to claim 6, further comprising:
    suspending a program executed by the first processing apparatus;
    recording into the data allocated to the first processing apparatus, a stop position of a program code when the program is suspended at the suspending; and
    transmitting the data to the second processing apparatus.

8. The data allocation method according to claim 5, wherein
    the exchanging includes refraining from exchanging data when the first communication speed is lower than the second threshold value.

9. The data allocation method according to claim 8, wherein
    when no exchange of data is executed between the processing apparatuses:

the allocating includes reallocating the data to the processing apparatuses, and the data allocation method further includes resetting the threshold value based on the communication speed.

10. The data allocation method according to claim 1, further comprising determining an exchange of the data of the first processing apparatus and the data of the second processing apparatus, when the first communication speed decreases and a priority level indicated by the second priority level information is higher than a priority level indicated by the first priority level information, based on a size of data allocated to the first processing apparatus, a size of data allocated to the second processing apparatus, the first and the second processing speeds, and an amount by which the first communication speed decreases.

11. The data allocation method according to claim 1, further comprising executing the allocation of data and the priority level information by a predetermined processing apparatus that is included among the processing apparatuses or by a higher order managing apparatus that manages the predetermined processing apparatus.

12. A data allocation system comprising a CPU in a processing apparatus that transfers data among a plurality of processing apparatuses, wherein the CPU allocates to a first processing apparatus included among the processing apparatuses and based on a first communication speed of the first processing apparatus, the data having communication amount information on a frequency at which the processing apparatuses access the data, and further supplies first priority level information to the first processing apparatus, and the CPU exchanges based on variation of a communication speed of at least one processing apparatus among the processing apparatuses, the data or the first priority level information, and data or second priority level information allocated to a second processing apparatus included among the processing apparatuses and having a second communication speed.

13. The data allocation system according to claim 12, wherein the processing apparatuses are communication terminals that execute radio communication with each other through a base station.

* * * * *